United States Patent
Vollmer

(10) Patent No.: US 7,263,093 B1
(45) Date of Patent: Aug. 28, 2007

(54) CONTROL METHOD

(75) Inventor: Vasco Vollmer, Gartow (DE)

(73) Assignee: Robert Bosch GmbH, Stuttgart (DE)

( * ) Notice: Subject to any disclaimer, the term of this patent is extended or adjusted under 35 U.S.C. 154(b) by 1095 days.

(21) Appl. No.: 10/130,905

(22) PCT Filed: Nov. 21, 2000

(86) PCT No.: PCT/DE00/04109

§ 371 (c)(1),
(2), (4) Date: Sep. 30, 2002

(87) PCT Pub. No.: WO01/39432

PCT Pub. Date: May 31, 2001

(30) Foreign Application Priority Data

Nov. 23, 1999 (DE) ............................... 199 56 318

(51) Int. Cl.
*H04B 17/00* (2006.01)
*H04L 12/26* (2006.01)
*H04J 1/16* (2006.01)
*G06F 11/00* (2006.01)

(52) U.S. Cl. ...................... 370/352; 370/229; 370/245; 455/67.1

(58) Field of Classification Search ........ 370/312–335, 370/349–352, 395–480; 455/436–442, 502–525
See application file for complete search history.

(56) References Cited

U.S. PATENT DOCUMENTS

| 6,137,791 | A * | 10/2000 | Frid et al. ................... 370/352 |
|---|---|---|---|
| 6,272,148 | B1 * | 8/2001 | Takagi et al. ................ 370/469 |
| 6,332,077 | B1 * | 12/2001 | Wu et al. .................. 455/432.1 |
| 6,370,369 | B1 * | 4/2002 | Kraiem et al. ............. 455/277.1 |
| 6,418,128 | B1 * | 7/2002 | Takagi et al. ................ 370/328 |
| 6,587,680 | B1 * | 7/2003 | Ala-Laurila et al. ........ 455/411 |
| 6,681,256 | B1 * | 1/2004 | Kuntze et al. .............. 709/236 |
| 6,697,627 | B1 * | 2/2004 | Ueno ....................... 455/452.1 |
| 6,879,830 | B1 * | 4/2005 | Vollmer et al. ............. 455/442 |
| 6,891,857 | B1 * | 5/2005 | Nevo et al. ................. 370/480 |
| 7,039,021 | B1 * | 5/2006 | Kokudo ...................... 370/310 |
| 7,046,646 | B2 * | 5/2006 | Kilgore ...................... 370/331 |
| 7,088,686 | B1 * | 8/2006 | Radimirsch ................. 370/278 |

FOREIGN PATENT DOCUMENTS

| EP | 0 903 905 | 3/1999 |
|---|---|---|
| WO | WO98 38808 | 9/1998 |

OTHER PUBLICATIONS

Prasad N R et al., "A State-of-the-art of Hiperlan/2" Amsterdam, Sep. 19-22, 1999, New York, NY: IEEE, US, vol. CONF. 50, Sep. 19, 1999, pp. 2661-2666.

* cited by examiner

*Primary Examiner*—Man U. Phan
(74) *Attorney, Agent, or Firm*—Kenyon & Kenyon LLP

(57) ABSTRACT

A method of controlling a first wireless station and a second wireless station is described, the wireless stations being connected with one another via at least one communication link and being controlled according to a communication protocol, the first wireless station communicating with at least one terminal according to a frame-structured wireless transmission protocol using packet transfer, with control messages being defined via an additional protocol layer using the communication protocol for controlling the at least one link and/or for managing the wireless stations.

8 Claims, 3 Drawing Sheets

CONTROL METHOD

FIELD OF THE INVENTION

The present invention relates to a method of controlling wireless stations in a wireless network.

BACKGROUND INFORMATION

Wireless networks in the form of LANs (Local Area Networks) may be implemented using an at least partially wireless LAN. Such a wireless LAN may be implemented, for example, as a cellular network, in which a central unit or a wireless station serves a wireless cell. A plurality of terminals may be located in this wireless cell. The wireless stations may be connected via a wire-bound network such as an IP network, for example. One example of such a wireless LAN may include the "Type 2 BRAN/HIPERLAN" standardization project of ETSI (European Telecommunication Standards Institute). Thus, a wireless LAN may contain a core network, which may be wire-bound, via which the wireless stations are connected to one another. The wireless stations may communicate with one another via the core network according to a common communication protocol such as IP (Internet Protocol), for example, using UDP (User Data Protocol), which may allow connectionless transmission of data packets via the IP network. In contrast with TCP (Transmission Control Protocol), in this case no functions may be provided for data security; therefore, there may be no security against duplication or loss, or against individual data packets overtaking one another on the IP network. UDP data packets may be transmitted at a high rate for this purpose. The communication protocol of the core network, i.e., the IP protocol, for example, may be used in the entire LAN; however, it may not be configured for specific signaling between the communication partners of the wireless portion of the LAN.

SUMMARY OF THE INVENTION

An exemplary method according to the present invention may provide that information which is specific to the wireless transmission protocol, i.e., the protocol for communication between communication partners of the wireless portion of the LAN, may be transmitted via the core network. The exemplary method according to the present invention may be used for the transmission of control information which is specific to the wireless transmission protocol, since this may allow individual procedures to be performed at a considerably higher speed in the wireless portion of the LAN. In addition, the wireless interface may be relieved of data, so that the overall performance of the network may be enhanced. Furthermore, some services may become feasible for the first time due to the use of control information which may be specific to the wireless transmission protocol, in particular, service and maintenance services, which may not be available if no wireless-transmission-specific control information is transmittable via the core network.

The additional protocol layer may ensure that after the transmission of a first control message from the second wireless station to the first wireless station, the transmission of the first control message may be repeated by the second wireless station if a second control message originating from the first wireless station and acknowledging and/or responding to the first control message is not received by the second wireless station within a time interval. Thus, high-speed transmission of data packets, in particular by using the UDP protocol, may be combined with control of successful transmission of data packets.

A handover at the at least one terminal from communication with the first wireless station to communication with the second wireless station may be supported by an appropriate selection of the time interval so that the at least one link may not be interrupted. Therefore, continuous communication may be ensured between a terminal and a wireless station, even in the event of a handover from one wireless station to another wireless station at the terminal.

A list of the wireless stations reachable via the communication protocol may be kept and may be updated in regular time intervals in the first wireless station. This may ensure that up-to-date information about the reachable wireless stations exists in each of the wireless stations, so that any change in the configuration of the core network, in particular, by adding or removing individual wireless stations, may be automatically recognized by each of the wireless stations.

Control messages may be exchanged between the first wireless station and the second wireless station, each of the control messages including a first part which defines a message type of the control message, a second part which defines options of the control message, and a third part which contains data. Thus the control messages may be adaptable to the requirements of the information to be transmitted.

In the third part of a control message, information elements, for example, the frequency used by a wireless station, the interference situation of a wireless station, the traffic situation in a wireless cell assigned to a wireless station, the statistical parameters of the recent traffic situation, and the error reports may be transmitted between the wireless stations for controlling and/or managing these stations. Thus the LAN may be managed and controlled by the exchange of control messages between different wireless stations.

The control messages may be encrypted prior to being transmitted. This may provide greater security against unauthorized eavesdropping or corruption of the exchanged control messages.

The wireless transmission protocol may correspond to the HIPERLAN or HIPERLAN-2 standard. This may allow the exemplary method according to the present invention to be used by all LAN networks operated according to this standard.

The communication protocol may correspond to the IP (Internet Protocol) standard in conjunction with the UDP protocol (User Data Protocol), based either on an Ethernet standard, an IEEE-802.3 standard, an ATM(Asynchronous Transfer Mode) standard, an IEEE-1394 standard, or a UMTS(Universal Mobile Telecommunication Service) standard. Thus a plurality of different communication protocols may be usable on the core network level.

DETAILED DESCRIPTION

Figure 1:
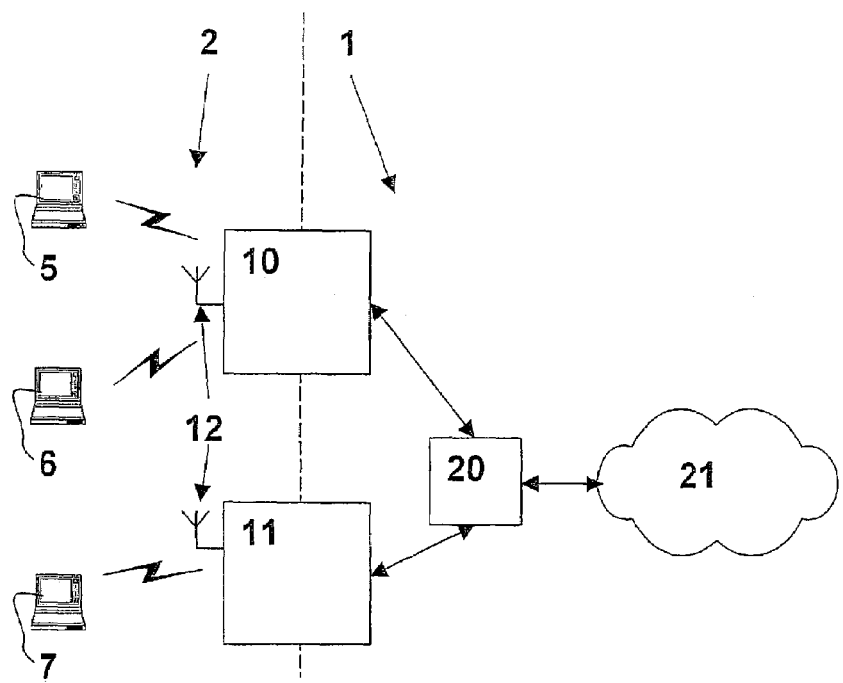
FIG. 1 shows a wireless LAN having a core network and a wireless portion of the LAN.

FIG. 1 shows a wireless LAN which has a core network 1 and a wireless portion 2 of the LAN. Core network 1 has a first wireless station 10, a second wireless station 11, a communication link 20, and additional stations 21 of core network 1. Both first wireless station 10 and second wireless station 11 are connected bidirectionally to communication link 20. Furthermore, communication link 20 is connected bidirectionally to additional stations 21 of core network 1. Wireless stations 10, 11 are also parts of the wireless portion of the LAN. For this purpose, first wireless station 10 and second wireless station 11 each include a transmitting/receiving antenna 12. A first terminal 5, a second terminal 6, and a third terminal 7 are also parts of wireless portion 2 of the LAN. Terminals 5, 6, and 7 are equipped with transmitting/receiving antennas (not shown) and thus are capable of engaging in wireless communication with wireless stations 10, 11. A broken line separates wireless portion 2 of the LAN from core network 1 of the LAN and runs so that wireless stations 10, 11 form the interface between wireless portion 2 and core network 1 of the LAN. Wireless stations 10, 11, additional stations 21, and communication link 20 of core network 1 may be connected to one another via wires according to the present invention. The wireless links between terminals 5, 6, 7 and wireless stations 10, 11 are provided via an air interface according to the present invention as radio links in particular, but may also be provided as infrared links, optical links, or the like.

First wireless station 10 serves a first wireless cell (not shown) of the LAN, and second wireless station 11 serves a second wireless cell (not shown) of the LAN. First and second wireless stations 10, 11 represent a plurality of wireless stations in the present exemplary embodiment. Likewise, terminals 5, 6, 7 represent a plurality of terminals, each of which communicates with one of wireless stations 10, 11 at a given time and is also capable of changing wireless stations 10, 11 via a handover procedure. Terminals 5, 6, 7 maintain at least one link to wireless station 10, 11 of their wireless cell, which may also be referred to as a logical link. Multiple logical links may be provided between a terminal 5, 6, 7 and a wireless station, each of these logical links being used for a different service which is used at the terminal, for example. Such services may include telephony, data transmission, or the like, for example. Additional stations 21 of core network 1 are configured as additional wireless stations, IP servers, or the like.

Figure 2:
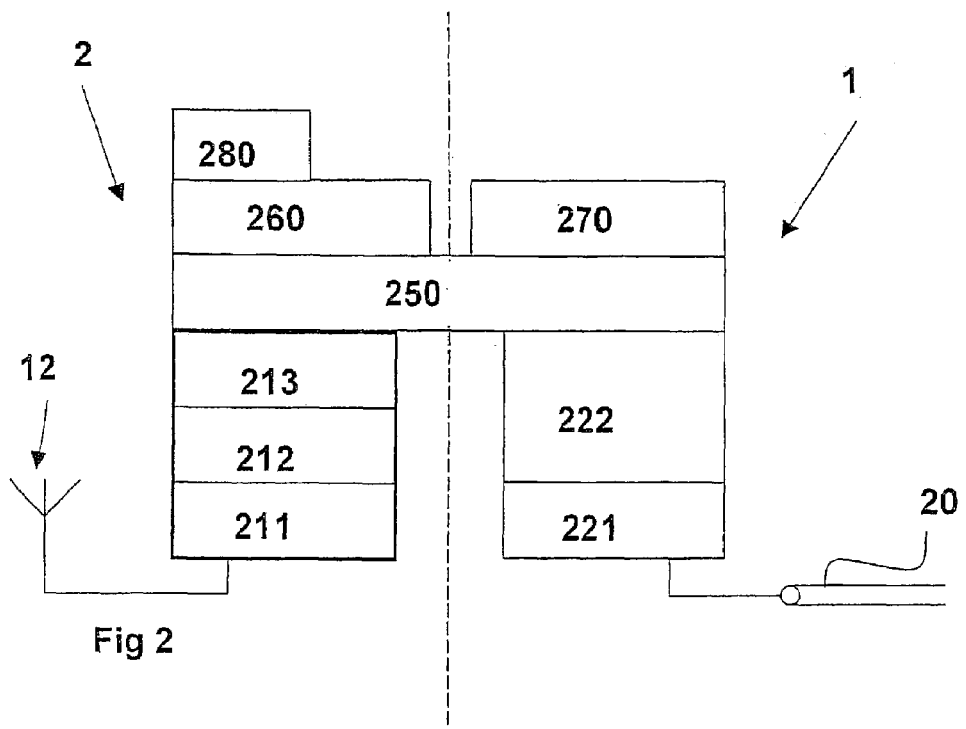
FIG. 2 shows a protocol diagram of the wireless LAN.

FIG. 2 shows an exemplary protocol diagram according to the present invention of one of wireless stations 10, 11. The feature that wireless station 10, 11 forms the interface between core network 1 and wireless portion 2 of the LAN in the LAN according to the present invention is also visible in the protocol diagram. In the exemplary protocol diagram according to the present invention, the protocols used in a wireless station 10, 11 are divided into protocols used for the communication via communication link 20 and protocols used for communication with terminals 5, 6, 7 via the air interface, whose data is transmitted and received via antennas 12. On the basis of the OSI (Open System Interconnection) reference model, the exemplary protocol diagram according to the present invention has, at a lowermost level, a first physical layer 221 and a second physical layer 211, first physical layer 221 being essentially used for physically connecting wireless stations 10, 11 to communication link 20, and second physical layer 211 essentially providing the wireless interface to antenna 12, i.e., to terminals 5, 6, 7. Above first physical layer 221 there is a first intermediary layer 222 in the exemplary protocol diagram according to the present invention, which is provided in the form of an Ethernet interface, for example, according to the present invention. Above second physical layer 211 there is a first partial layer 212 of a second intermediary layer (not shown separately). First partial layer 212, hereinafter also referred to as DLC (Data Link Control) layer, may contain all functions that are specific to the wireless interface, the control of access to the wireless interface, i.e., the MAC (Medium Access Control) being implemented here in particular. Above first partial layer 212 there is a second partial layer 213 of the second intermediary layer, which may perform the adaptation of the functions and data types of the wireless interface to the higher-level format. Second partial layer 213 also referred hereinafter as CL layer (Convergence Layer) 213. According to an exemplary embodiment of the present invention, the wireless interface is provided as a HIPERLAN-2 wireless interface in particular, so that second partial layer 213 performs the adaptation of the HIPERLAN-2 functions and data types to the higher-level format, i.e., second partial layer forms packets capable of using the communication protocol above second partial layer 213 from the packets present in the HIPERLAN-2 data format. Both above first intermediary layer 222 and above second intermediary layer, i.e., above second partial layer 213, the exemplary protocol diagram according to the present invention includes a communication protocol which includes, according to the present invention, an IP layer 250 and a UDP layer 260 according to the present invention. IP layer 250 receives IP data packets from second partial layer 213 and is responsible for a router functionality, so that the IP packets are supplied either to another wireless station 10, 11, i.e., another station 21 of core network 1 via first intermediary layer 222 or to a higher-level layer within wireless station 10, 11. UDP layer 260 is located above IP layer 250 and only represents a transport procedure via which data can be transmitted between a transmitter and a receiver which are connected via an IP-based network. However, no security is provided for the transmitted data packets in UDP layer 260, i.e., lost or duplicated packets are not recognized as such in a transmission. Above the communication protocol, the protocol diagram includes an additional protocol layer 280, which is used to support the wireless transmission protocol, in particular the HIPERLAN-2 network in a heterogeneous environment having an IP network. Additional protocol layer 280 is hereinafter referred to as HTCP (HIPERLAN Transport Control Protocol) layer 280. HTCP layer 280 is used in particular for communication among wireless stations 10, 11 and between wireless stations 10, 11 and an administrator. The function of HTCP layer 280 is, in particular, to support the wireless interface, i.e., in the present example, the HIPERLAN-2 interface, when performing certain functions and thus to alleviate the load on the wireless interface. For this purpose, the different wireless stations 10, 11 communicate with one another over core network 1. Since a cable-bound network may be operated with higher data rates than the air interface of the wireless transmission protocol, a clear data rate advantage may be obtained by transmitting the data to be exchanged between wireless stations 10, 11 via core network 1, which may have a positive effect for time-critical functions. Furthermore, the load on the air interface may be alleviated, allowing the interface to handle more useful data.

Figure 3:
FIG. 3 shows the structure of a control message.

The HTCP layer 280 of different stations connected to one another via core network 1, in particular wireless stations 10, 11, exchange control messages 100 which are also referred to as HTCP messages 100. FIG. 3 shows such an HTCP message 100, which contains a certain data format. The data format defines a first part 110, a second part 120, and a third part 130 in HTCP message 100. First part 110 provides the message type of HTCP message 100. Second part 120 provides the options of HTCP message 100, and third part 130 includes information elements which are carried by HTCP message 100. In particular, the information elements include the frequency used by a wireless station 10, 11, the interference situation of a wireless station 10, 11, the traffic situation in a wireless cell assigned to a wireless station 10, 11, the statistical parameters on the recent traffic situation, and the error reports. These information elements may be used for the control and/or management of wireless stations 10, 11 when exchanging control messages 100.

Figure 4:
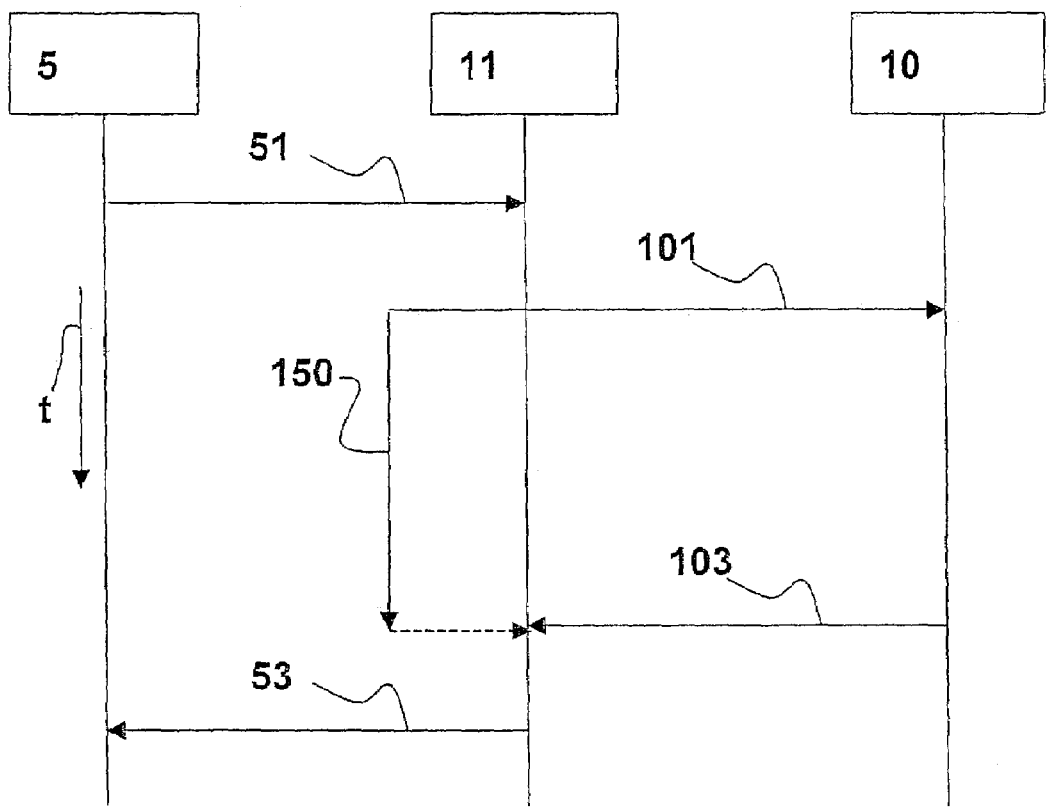
FIG. 4 shows a first signaling diagram in controlled transmission of control messages between wireless stations.
Figure 5:
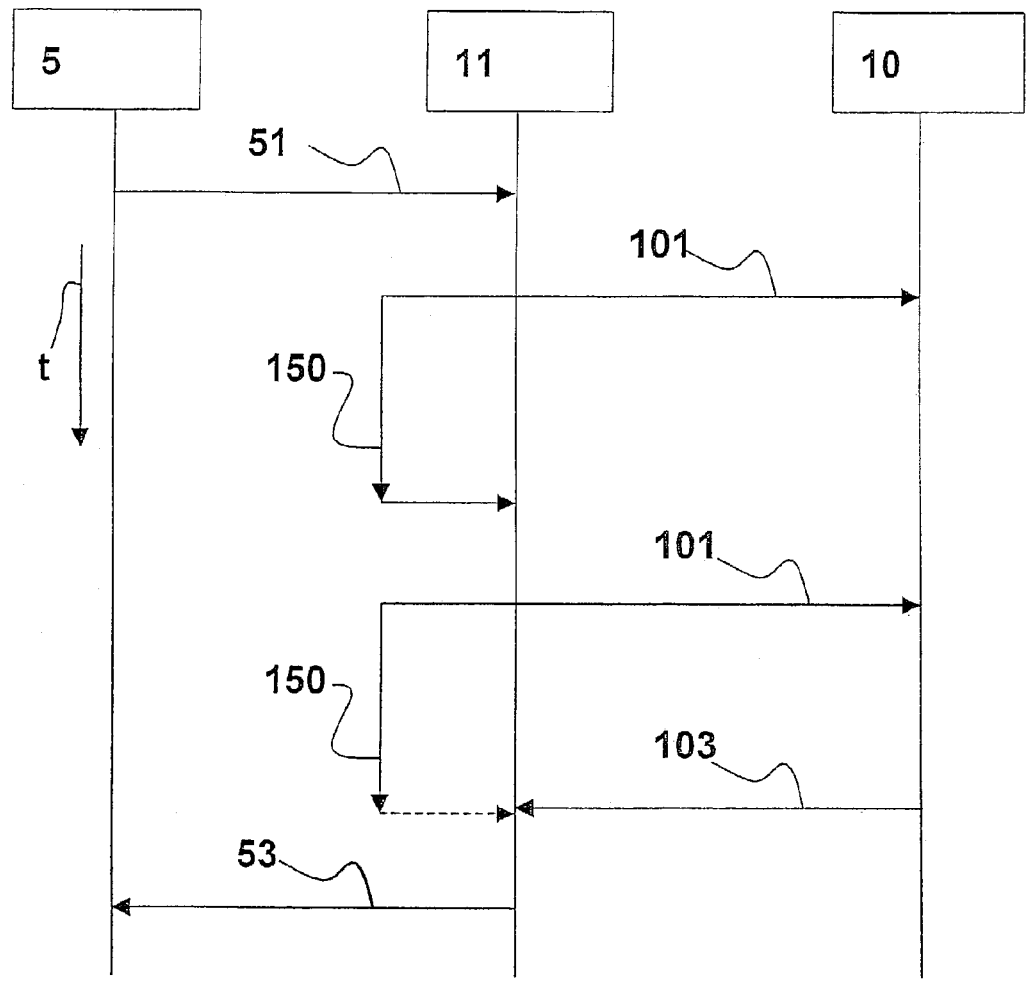
FIG. 5 shows a second signaling diagram in controlled transmission of control messages between wireless stations.

In the following, an example of performing a time-critical HIPERLAN-2 function using HTCP messages 100 is described with reference to FIGS. 4 and 5. FIG. 4 shows a first signaling diagram, and FIG. 5 shows a second signaling diagram in controlled transmission of control messages 100 between wireless stations 10, 11. Control messages 100 are used in this example to perform handover at first terminal 5 from communication with first wireless station 10 to communication with second wireless station 11. In this procedure, all communication links between first wireless station 10 and terminal 5 may be taken over and continue to be operated by second wireless station 11. For this purpose, the link data sets may be transferred into second wireless station 11. When first terminal 5 logs in at second wireless station 11 in a handover, for example, due to a change in a wireless cell, it transmits during this login the address of first wireless station 10. Then second wireless station 11 requests the link data from first wireless station 10 using this address and the ID of first terminal 5, which is transmitted during login. HTCP layer 280 of second wireless station 11 and HTCP layer 280 of first wireless station 10 communicate with one another to exchange control messages 100. Control messages 100 are transmitted via core network 1 which connects wireless stations 10, 11. In addition to the link data, direct communication between second wireless station 11 and first wireless station 10 also allows the authentication of first terminal 5 vis-a-vis second wireless station 11 and the transmission of any encryption codes to be performed. This may provide an additional rate advantage, since data may be transmittable at a higher data rate via core network 1 than via the wireless link between terminals 5, 6, 7 and wireless stations 10, 11.

To illustrate such a handover procedure, both FIG. 4 and FIG. 5 have a first vertical line, identified with reference number 5, which, running vertically from top to bottom, represents the variation over time of incoming and outgoing messages at first terminal 5. Furthermore, FIGS. 4 and 5 have a second vertical line identified with reference number 11, the second vertical line representing the variation over time of incoming and outgoing messages at second wireless station 11. Furthermore, in FIGS. 4 and 5 a third vertical line which represents the variation over time of incoming and outgoing messages at first wireless station 10 is identified with reference number 10. The orientation of the variation over time on the vertical lines is illustrated with a tenth arrow identified with reference symbol t, pointing vertically downward. After this joint description of the basic structure of FIGS. 4 and 5, FIG. 4 is described in more detail first.

In FIG. 4, a first horizontal arrow points from the first line to the second line. The first arrow corresponds to a handover indication 51, which is sent by first terminal 5 to second wireless station 11. Handover indication 51 contains the address of first wireless station 10, via which first terminal 5 conducted its communications before initiating the handover procedure. Furthermore, handover indication 51 contains an ID, with which first terminal 5 is identified (terminal ID). Handover indication 51 is transmitted according to wireless transmission protocol 211, 212. Thereafter, second wireless station 11 requests from first wireless station 10 the data sets required for performing the handover, via a first control message 101 (data set request) represented by a second arrow. The second arrow points from the second vertical line to the third vertical line and is located below the first horizontal arrow, which indicates that first control message 101 occurs chronologically after handover indication 51. Simultaneously with first control message 101, second wireless station 11 starts a time counter 150, which monitors whether a response is received by second wireless station 11 from first wireless station 10 within a predefined time interval. First control message 101, which is also referred to as data set request 101, is answered by first wireless station 10 via a second control message 103 represented by a fourth horizontal arrow. Second control message 103, which is also referred to as response 103, contains the required information for authentication, encryption, and the type of existing links between first terminal 5 and first wireless station 10. The fourth arrow points from the third line to the second line. Time counter 150 is represented by the third arrow, which points vertically downward; it begins at the level of the second arrow and its length corresponds to a predefined time interval within which second wireless station 11 must receive response 103 to data set request 101 from first wireless station 10. In FIG. 4, the response is received in time, which is illustrated by the fact that the fourth arrow is situated above the end point of the third arrow. Thus FIG. 4 shows the case where response 103 from first wireless station 10 is received in time by second wireless station 11. When response 103 is received, time counter 150 is cleared. Request 101 used for communication between wireless stations 10, 11 and response 103 are control messages 100 having the basic structure shown in FIG. 3. As mentioned above, for the example of the handover at first terminal 5 from first wireless station 10 to second wireless station 11, control messages 100 are used for requesting the data sets and for responding to this request. For other communication situations, for example, for managing wireless stations 10, 11, other control messages 100 are used, whose parts 110, 120, 130 are configured according to the respective communication situation. The communication and data formats between first terminal 5 and second wireless station 11 may be described according to the present invention by the HIPERLAN-2 standard in particular. For this purpose, second wireless station 11 transmits a handover acknowledgment 53, represented by a fifth horizontal arrow, to first terminal 5. The fifth arrow points from the second vertical line to the first vertical line. The fifth horizontal arrow is situated below the fourth arrow, which corresponds to a later point in time for handover acknowledgment 53 with respect to response 103.

FIG. 5 shows the second signaling diagram in controlled transmission of control messages 100 between first terminal 5 and first or second wireless station 10, 11. The start of communication in the second signaling diagram is identical to the start of communication in the first signaling diagram; therefore, the first arrow, the second arrow, and the third arrow in FIG. 5 are identical to those in FIG. 4. Thereafter the signaling diagrams differ in terms of the time progression. In FIG. 5, no response 103 is received by second wireless station 11 from first wireless station 10 by the time when time counter 150 has expired. Thereupon second wireless station 11 repeats data set request 101, which is represented by a sixth horizontal arrow, which points from the second line to the third line and is situated below the end point of the third arrow. At the same time, time counter 150 starts for the second time, which is represented by a seventh arrow pointing vertically downward. The seventh arrow begins at the level of the sixth arrow and represents the predefined time interval within which second wireless station 11 expects response 103 to data set request 101. Upon repeated data set request 101, second wireless station 11 receives response 103, represented by an eighth horizontal arrow, from first wireless station 10 in time before time counter 150 expires. The eighth arrow points from the third vertical line to the second vertical line above the end point of the seventh arrow. Time counter 150 is then cleared. The handover at first terminal 5 from first wireless station 10 to second wireless station 11 is terminated by handover acknowledgment 53 from second wireless station 11 to first terminal 5. This is represented by a ninth horizontal arrow, which points from the second line to the first line.

In the exemplary embodiment, the core network is configured as an Ethernet or IEEE 802.3 network, since most of today's local area networks may be configured as Ethernet networks carrying IP packets via Ethernet/IEEE 802.3. Therefore it may make sense to also transmit IP/UDP/HTCP data via the Ethernet/IEEE 802.3 standard.

However, HIPERLAN-2 also allows the use of other core networks 1, such as ATM, IEEE-1394 or UMTS. In these cases, an IP protocol stack may not always be available. Therefore, either IP may be carried over the respective core network or a service other than IP/UDP may be used. In the case where UMTS is used in core network 1, it also has a wireless configuration.

In order to further improve security, it may be expedient to additionally encrypt the communication via HTCP between wireless stations 10, 11 in order to prevent eavesdropping or corruption of the HTCP packets in the core network. For this purpose, existing encryption mechanisms defined for IP may be available. Since HIPERLAN-2 may use addresses for wireless stations 10, 11 that are different from those used by IP, these addresses may be required to be converted. For this purpose, it may be expedient to keep, in each wireless station 10, 11, a list containing the reachable (other) wireless stations 10, 11 in which both addresses for each reachable wireless station 10, 11 are listed. These addresses may be obtained dynamically and cleared after a predefined time period in order to keep the list up to date. The address of a wireless station 10, 11 may be determined by sending an HTCP information element in third part 130 of a control message 100 with a request for a HIPERLAN-2 address of the reachable wireless stations 10, 11 as a broadcast message to all reachable wireless stations 10, 11. Wireless station 10, 11 having the requested HIPERLAN-2 address may answer this request and communicate its own IP address in its response.

The invention claimed is:

1. A method of controlling a first wireless station and a second wireless station that are connected to one another via a communication link using a communication protocol, the method comprising:

configuring the first wireless station to communicate with at least one terminal according to a frame-structured wireless transmission protocol using packet transfer, wherein a link-oriented communication between the first wireless station and the at least one terminal is enabled by the framed-structured wireless transmission protocol via at least one link;

providing an additional protocol layer using the communication protocol to enable a communication between the first wireless station and the second wireless station over a cable-bound network to exchange control messages for controlling the at least one link; and ensuring via the additional protocol layer that after a transmission of a first control message from the second wireless station to the first wireless station, the transmission of the first control message is repeated by the second wireless station if a second control message originating from the first wireless station and at least one of acknowledging and responding to the first control message is not received by the second wireless station within a time interval.

2. The method according to claim 1, further comprising:

selecting a time interval for a handover at the at least one terminal from a communication with the first wireless station to a communication with the second wireless station so that the at least one link is not interrupted.

3. The method according to claim 1, further comprising:

maintaining in the first wireless station a list of wireless stations reachable via the communication protocol.

4. The method according to claim 3, further comprising:

updating in regular time intervals the list of wireless stations.

5. The method according to claim 1, wherein each of the control messages exchanged between the first wireless station and the second wireless station includes a first part defining a message type of the control message, a second part defining options of the control message, and a third part including data.

6. The method according to claim 5, wherein the first wireless station and the second wireless station are controlled by transmitting information elements between the first wireless station and the second wireless station in the third part of the control messages.

7. The method according to claim 6, wherein the information elements include at least one of: a frequency used by one of the wireless stations; an interference situation of one of the wireless stations; a traffic situation in a wireless cell assigned to one of the wireless stations; statistical parameters of a recent traffic situation; and error reports.

8. The method according to claim 1, further comprising:

encrypting the control messages prior to being transmitted.

* * * * *